(12) United States Patent
Swander (10) Patent No.: US 7,389,532 B2
(45) Date of Patent: Jun. 17, 2008

(54) METHOD FOR INDEXING A PLURALITY OF POLICY FILTERS

(75) Inventor: Brian D. Swander, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 956 days.

(21) Appl. No.: 10/722,831

(22) Filed: Nov. 26, 2003

(65) Prior Publication Data
US 2005/0114704 A1 May 26, 2005

(51) Int. Cl.
*G06F 15/16* (2006.01)
*G06F 17/00* (2006.01)
*G06F 9/00* (2006.01)

(52) U.S. Cl. ............ 726/11; 713/153; 713/154
(58) Field of Classification Search .......... 726/11, 726/4; 713/154, 153
See application file for complete search history.

(56) References Cited

U.S. PATENT DOCUMENTS 5,987,611 A 11/1999 Freund
6,798,777 B1* 9/2004 Ferguson et al. ........... 370/392
7,039,641 B2* 5/2006 Woo ........................... 707/100
2004/0013112 A1* 1/2004 Goldberg et al. ........... 370/389

OTHER PUBLICATIONS

U.S. Appl. No. 10/456,433, filed Jun. 6, 2003, Swander, et al.
U.S. Appl. No. 10/456,766, filed Jun. 6, 2003, Swander, et al.
U.S. Appl. No. 10/456,770, filed Jun. 6, 2003, Swander, et al.
U.S. Appl. No. 10/456,093, filed Jun. 6, 2003, Swander, et al.

* cited by examiner

*Primary Examiner*—Gilberto Barron, Jr.
*Assistant Examiner*—Samson B Lemma
(74) *Attorney, Agent, or Firm*—Wolf, Greenfield & Sacks, P.C.

(57) ABSTRACT

A preprocessor used in conjunction with a network firewall is disclosed. The preprocessor creates a first index for identifying a plurality of filters installed in the firewall. The preprocessor maintains statistics including selected criteria and corresponding values for the installed filters. When the value for the selected criteria exceeds a threshold value, the preprocessor creates a second index and moves a subset of filters from the first index to the second index.

26 Claims, 10 Drawing Sheets

Statistics 430

| Criteria 432 | Value 434 | Threshold 436 |
|---|---|---|
| Source IP Addr: /16 | 50 | 1000 |
| Destination IP Addr: /16 | 100 | 1000 |
| Average Weight: [Source IP Addr] | 25 | |

METHOD FOR INDEXING A PLURALITY OF POLICY FILTERS

TECHNICAL FIELD

This invention generally relates to computer systems and to network security. More particularly, this invention relates to a method of indexing filters that define network policy implemented on a network device.

BACKGROUND OF THE INVENTION

Network protocols, such as the Internet Protocol (IP), are designed to facilitate communication between network devices through an open exchange of data. However, standard IP and other similar protocols were not designed for, and do not provide, network security. As a result, network devices are susceptible to malicious attacks perpetrated through the network including theft of data, denial of service attacks, the proliferation of computer viruses, and the like.

A firewall is a tool used to protect individual users, network devices, and networks in general, from malicious attacks, while also adding the ability to control the exchange of data over the network through implementation of a policy. The firewall implements the policy by examining network packets and determining, based on the examination, whether the packets should be permitted, or conversely blocked, from further traversing the network. Other functions including intrusion detection, virus protection, and parental controls are also implemented through the firewall.

A component of the firewall is a set of filters. A filter is a data structure that includes filter conditions and actions. The filter conditions are used to identify packets that are subject to the actions specified in the filter. Examples of filter conditions include hardware addresses, e.g. media access control (MAC) addresses, network addresses, e.g. Internet protocol (IP) addresses, protocol type, e.g. transport control protocol (TCP), and port numbers. Examples of actions specified in a filter include permit, i.e. allow the packet to continue to traverse the network and block, i.e. preclude the packet from further network traversal.

The filters are organized in an index. When a packet is sent from, or received by, a network device, the firewall traverses the index to identify any "matching" filters. The firewall identifies matching filters by comparing information in the packets, e.g. IP addresses, ports, and/or protocol, to corresponding filters conditions in one or more of the filters. If the packet information satisfies all filter conditions in a filter, the filter matches the packet. After the firewall identifies any matching filters, the network device determines whether to take any actions specified in the matching filters.

When the types of filter conditions designated in the filters are static and predictable, the type of index used, and organization thereof, can be pre-selected for the filters. Some firewalls, however, permit generic filters to be used wherein the filter conditions are extensible and dynamically change depending on system need. Accordingly, it is not possible to pre-select an optimal index type and index organization. Moreover, a single type of index may not be suitable for indexing all filters.

SUMMARY OF THE INVENTION

The invention is directed to a preprocessor used as part of a network firewall. The firewall includes filters having filter conditions and corresponding actions. The actions in a filter specify network policy such as whether to allow a packet to traverse the network or whether the packet should be dropped. Filter conditions identify which packets are subject to the actions in the filter by specifying packet information such as IP addresses, ports, protocols and the like.

When the firewall receives a packet, the firewall examines the packet and compares information in the packet to the filter conditions in one or more of the filters. If the information in the packet satisfies all filter conditions in a given filter, the filter is said to match the packet and the packet is subject to the corresponding actions in the filter. The filters are identified by one or more indices, which indices are used by the firewall to locate the matching filters.

The preprocessor creates a first index for identifying the filters. As new filters are added to the firewall, the preprocessor updates the first index to identify the new filters. The preprocessor also maintains statistics on the filters in the firewall. The statistics include the number of filters that meet one or more criteria. When the number of filters meeting the one or more criteria exceeds a threshold value, the preprocessor creates a second index. The preprocessor then moves the filters meeting the one or more criteria that exceed the threshold value into the second index.

The preprocessor also selects an index type and a filter order for the second index. The index type selected by the preprocessor based upon the types of filter conditions specified in the filters meeting the criteria that exceed the threshold value. The filter order determines the order by which the filters are referenced in the index. Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

Figure 1:
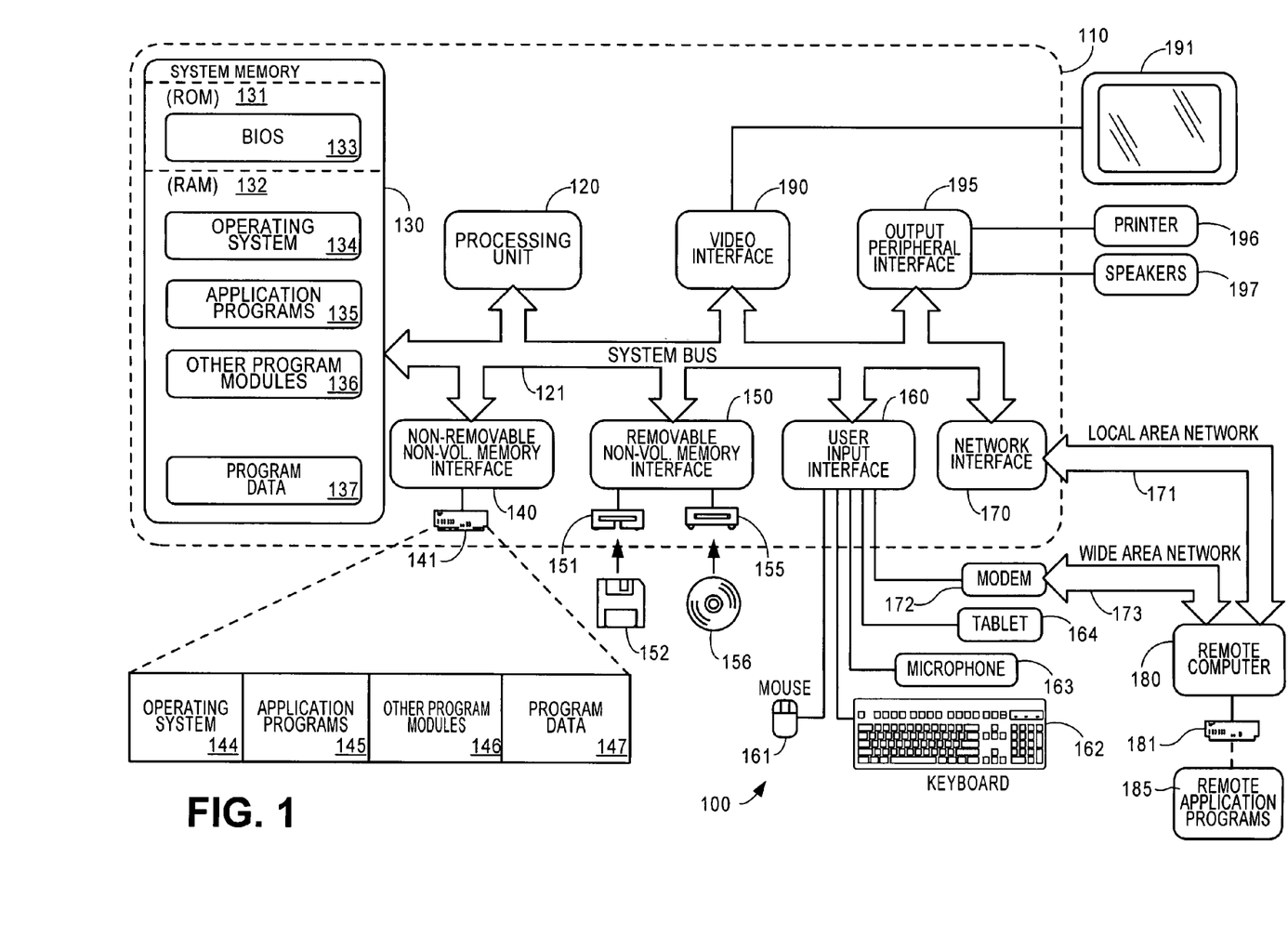
FIG. 1 is a block diagram generally illustrating an exemplary computer system on which the present invention resides.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
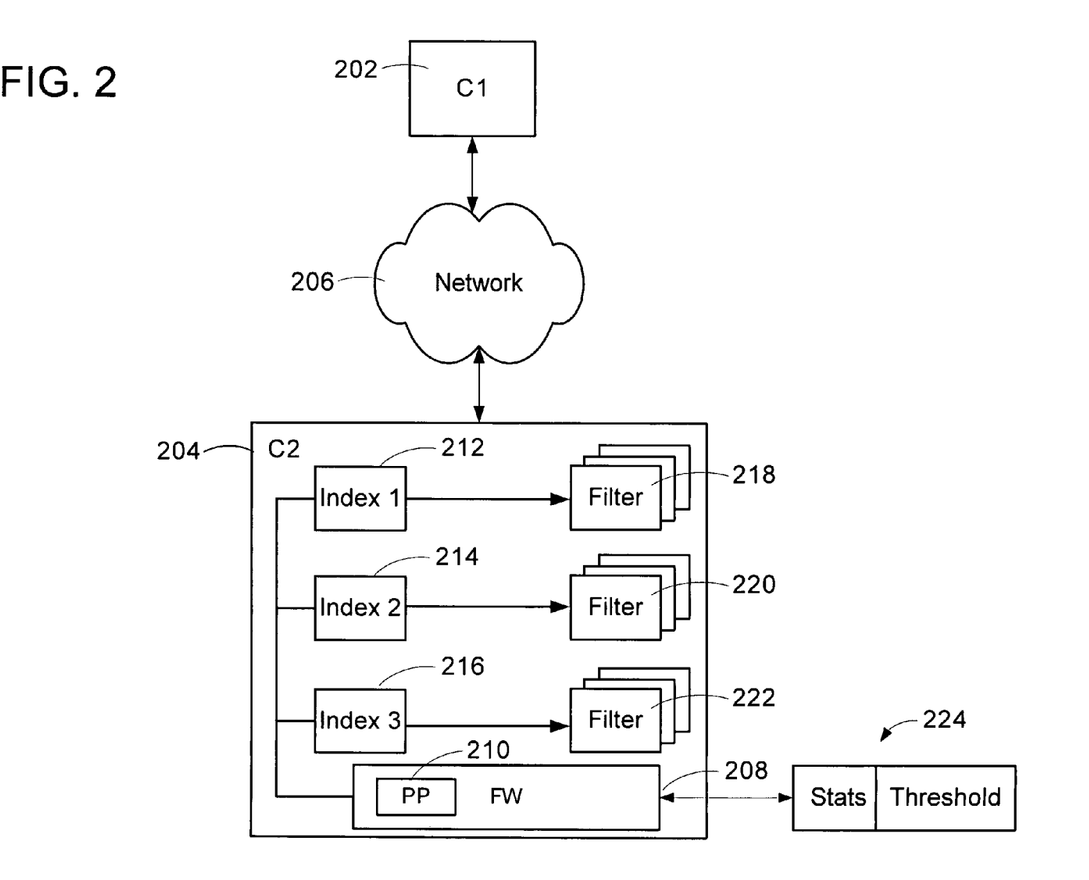
FIG. 2 is a block diagram generally illustrating a network environment where the method of the present invention may be employed.

FIG. 2 illustrates an exemplary network environment wherein the present invention is used. The network environment includes a plurality of network devices 202 and 204 communicatively coupled to a network 206. The network is any suitable type such as a Local Area Network (LAN), Wide Area Network (WAN), intranet, the Internet or the like.

The network devices 202, 204 are shown as directly coupled to the network 206. The network devices 202, 204 may, however, be coupled to the network 206 through other devices such as gateways, proxies, routers, network address translation devices or even through one or more additional networks. The network devices 202, 204 are implemented as any suitable computing device including personal computers, servers, handheld devices, printers, switches, routers, bridges, repeaters or the like.

The network device 204 communicates with the network device 202 by exchanging packets of data according to a protocol, such as the Internet Protocol (IP). Packets sent from the network device 204 to the network device 202 are referred to herein as outbound packets and packets sent from the network device 202 to the network device 204 are referred to herein as inbound packets.

The network device 204 includes a firewall 208. The firewall 208 examines inbound and outbound network packets and determines based on a network policy whether to allow the packet to traverse the network or whether to block the packet from further network traversal. The firewall 208 also performs additional functions such as parental control, packet logging, intrusion detection, and the like. The network device 204 includes a set of firewall indices 212, 214, 216 and filters 218, 220, 222 that are used in conjunction with the firewall 208 to implement the network policy.

The filters 218, 220, 222 define the network policy applied to the inbound and outbound packets. Each filter is a data structure that includes a set of filter conditions and corresponding actions. The filter conditions are used to identify packets that are subject to the actions specified in the filter. Filter conditions include information that can be parsed or otherwise obtained from network packets such as interface numbers, hardware addresses, network addresses, protocol type, port numbers, and payload data. The action instructs the firewall 208 or other system processes how to treat the packet if it matches the filter conditions. Examples of actions include permit, i.e. allow the packet to traverse the network and block, i.e. prevent the packet from further traversing the network.

The filter indices 212, 214, 216 provide a way to organize the filters so that the firewall 208 can locates the filters and identify filters that match the packet under examination. The firewall identifies matching filters by comparing the information in the packet to the filter conditions specified in the filters. If the information in the packet, e.g. IP addresses, ports, protocol type, satisfies all filter conditions in the filter, the filter is said to match to the packet and the packet is subject to the specified action.

The firewall 208 includes a module called a preprocessor 210. In accordance with the invention, the preprocessor is used to create the indices. The first index 212, also referred to herein as a general purpose index, is created by the preprocessor 210 when a first filter is added to the firewall. Initially, subsequent filters added to the firewall 208 are included in the general purpose index 212.

The preprocessor 210 further maintains a data structure 224 that includes statistics on the filters installed as part of the firewall. The statistics include information such as the number of filters that meet designated criteria. As an example, the statistics include the number of filters having a filter condition designating source IP addresses using a specific subnet mask. Each criteria includes a corresponding threshold value. When one or more of the criteria exceed the corresponding threshold value, the preprocessor takes appropriate action, such as creating the second index 214. The preprocessor then moves a subset of filters from the first index 212 to the second index 214. The preprocessor continues to maintain statistics and, if necessary, creates a third index 216 and moves a subset of filters from the first index 212 and/or second index 214 into the third index 216. The preprocessor 210 continues to maintain statistics, creates additional indices, and moves filters between indices as needed.

When creating a new index, such as the second index 214 or the third index 216, the preprocessor 210 selects an index type and a index order for the new index. The index type defines the organizational structure of the index. Index types include linked list, hash table, and tree structure. The index order establishes the order in which filters are searched by the firewall when traversing the index. The index types and index order are selected to optimize the ability of the firewall 208 to identify matching filters. In accordance with the invention, each index 212, 214, 216 can have a different index type. The preprocessor also selects a index fields if required for the index type.

The preprocessor 210 is executed as part of the firewall 208. The firewall 208 and preprocessor 210 execute as part of the operating system 134 in the network device 204. Alternatively, the preprocessor 210 and/or firewall 208 execute as one or more application programs.

Figure 3:
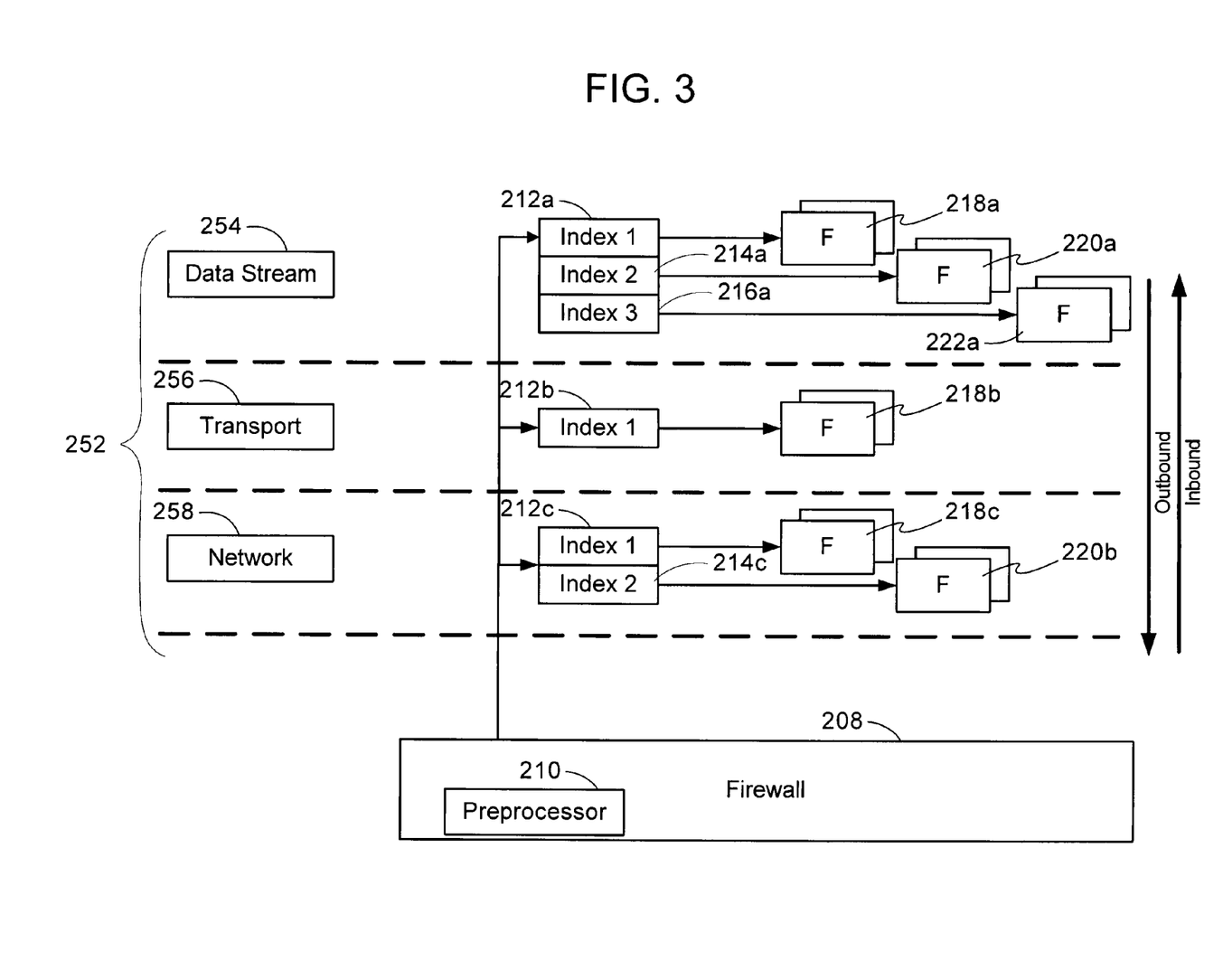
FIG. 3 is a block diagram generally illustrating a multi-layer firewall architecture where the method of the present invention may be employed.

FIG. 3 illustrates an embodiment of the invention wherein separate filter indices are maintained at each layer in a network stack. The embodiment shown in FIG. 3 is suitable for use in a multi-layered firewall architecture such as described in commonly owned U.S. patent application Ser. No. 10/456,766, entitled "Multi-Layered Firewall Architecture," filed Jun. 6, 2003, the contents of which are hereby expressly incorporated by reference.

The multi-layered firewall architecture includes a plurality of layers forming a network stack 252. The layers in the network stack 252 include a data stream layer 254, a transport layer 256, and a network layer 258. It will be understood by those skilled in the art that the network stack 252 may include additional layers such as a file access layer, e.g. server master block (SMB), a hypertext transfer protocol (HTTP) layer, a link layer, and the like. The use of network layers is well known and need not be described in detail herein.

Each layer includes its own set of indices and filters. For example, the data stream layer 254 includes a first index 212a, a second index 214a, and a third index 216a. The first index 212a identifies filters 218a. The second index 214a identifies filters 220a. The third index 216a identifies filters 222a. The transport layer 256 includes a first index 212b that identifies filters 218b. The network layer 258 includes a first index 212c and a second index 214c. The first index 212c in the network layer identifies filters 218c and the second index 214c identifies filters 220b.

The layers in the network stack 252 process inbound and outbound network packets. As indicated by the respective arrows shown in FIG. 3, inbound packets traverse the network stack 252 from bottom to top and outbound packets traverse the network stack 252 from top to bottom. At each layer, the firewall 208 compares information in the packet to the filters stored in that layer by traversing the indices in the layer. For example, at the network layer 258, the firewall 208 uses the general purpose index 212c and second index 214c to locate and identify any filters that match the packet.

After all of the indices in a layer have been checked and matching filters identified, the firewall notifies the layer of the actions designated in the matching filters. The layer then decides whether to take the designated actions. If the packet is not dropped and permitted to continue network traversal, the packet is sent to the next layer where the process is repeated until the packet is dropped or traverses all layers in the network stack 252.

Figure 4:
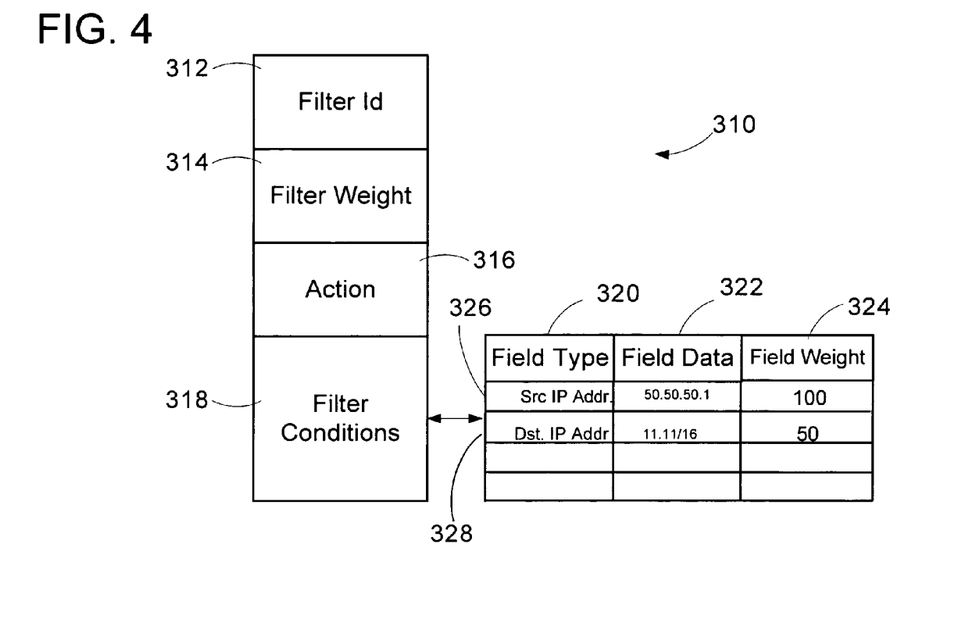
FIG. 4 is a block diagram illustrating an exemplary filter used with the present invention.

Referring to FIG. 4, an exemplary data structure for a filter 310 will now be described. The data structure is shown by way of example, and not limitation, as any suitable data structure is used to implement the filters used with the firewall. The filter 310 is shown in simplified form and may include additional data such as described in the previously mentioned co-pending U.S. patent application Ser. No. 10/456,766.

The filter 310 includes a filter Id 312, a filter weight 314, actions 316, and a set of filter conditions 318. The filter Id 312 provides a unique identification to the filter.

The filter conditions 318 are used by the firewall 208 to determine whether the filter 310 matches the packet under examination. Each filter condition 318 includes a field type 320, and corresponding field data 322. The filter condition 318 optionally includes a field weight 324. The field weight 324 need not be stored as a filter condition, but includes a value that can be calculated based on the field type 320 and the corresponding field data 322 as described below.

The field type 320 identifies the type of packet information to which the filter condition 318 is compared. Examples of the field types 320 include source IP address, destination IP address, source port, destination port, protocol type, URL address, payload data and the like.

The field data 322 includes a specific value corresponding to the field type 320. For example, if the field type 320 is a source IP address, an acceptable value for the field data 322 is a 32-bit number in range of 00.00.00.00 to 255.255.255.255 as expressed in dotted decimal notation, assuming the IP address conforms to IP version four. The field data 322 includes a single value or, alternatively, a range of values. For example, the field data 322 can include a range of IP addresses either expressed as an arbitrary range or as an address plus a mask. The field data 322 can also have a wild card value meaning that any packet will match the filter condition.

The field weight 324 of each filter condition depends on two factors. The first factor is the field type 320. Each field type 320 is assigned a minimum and maximum weight. The second factor is specificity of the field data 322. The specificity depends on the number of packets that potentially match the data 322. The more specific the data, the higher the weight. For example, if the data 322 includes a single source IP address, it is assigned the highest possible weight 324 assigned to the source IP address field type 320. Conversely, if the data 322 includes the wild card "any," it is assigned the lowest possible weight 324 assigned to the source IP address field type 320. If the data 322 includes a range of IP addresses that is less than all possible IP address, the weight for the filter condition is assigned an intermediate value between the maximum and minimum weights which is proportional to the size of the specified range.

Two examples of filters conditions 326, 328 are shown. The filter condition 326 has a field type 320 of "Src IP Addr," which in the example represents a source IP address. The field data 322 is "50.50.50.1." Accordingly, the filter condition 326 matches any packet that includes as its source IP address the value of 50.50.50.1. The field weight is 100.

The filter condition 328 has a field type 320 of "Dst IP Addr," which in the example represents a destination IP address. The field data 322 is "11.11/16." The "value/n" nomenclature used herein represents an address mask wherein only first n-bits of an address are considered when comparing packet information to the field data 322. The value represents the data of the first n-bits. In this particular example, only the first 16-bits of the destination IP address are considered because the field data 322 includes the delineator "/16." A packet that includes a destination IP address with the first 16-bits being "11.11" matches the filter condition regardless of the value of the remaining bits in the address. Thus, any destination IP address in the range of 11.11.0.0 to 11.11.255.255 matches the filter condition 328. The filter weight 324 is 50.

The firewall 208 compares the packet under examination to the filter 310 and determines that the filter 310 matches the packet if all filter conditions are satisfied. Referring again to the example filter conditions 326, 328, the filter matches any packet that has both a source IP address of 50.50.501 and a destination IP address in the range of 11.11.0.0 to 11.11.255.255.

The filter weight 314 identifies priority of the filter 310. The higher the filter weight 314, the higher the filter priority. The filter weight 314 is calculated based on an aggregate of the individual field weights 324 specified for the filter conditions 318.

The filter weight 314, and field weights 324 are calculated automatically, or alternatively manually assigned by, for example, a system administrator when the filter 310 is added to the firewall 208. A method of automatically calculating weight values is described in commonly owned U.S. patent application Ser. No. 10/456,433 entitled "Method for Managing Network Filter Based Policies," filed Jun. 6, 2003, which document is hereby expressly incorporated by reference.

The action 316 tells the firewall 208 how to handle packets that match the filter conditions 318. Typical actions include permit and block. The permit action instructs the firewall to allow the packet to continue to traverse the network stack. The block action instructs the firewall 208 to drop filter and prevent further network traversal. When the firewall 208 identifies a matching filter, the firewall notifies the layer of the action specified in the filter. The layer then decides whether or not to take the specified action. Alternatively, the firewall 208 only notifies the layer of actions from selected matching filters such as the actions specified in a filter with the highest weight value.

An exemplary set of index types used with the present invention will now be described with reference to FIG. 5-FIG. 7. It will be understood that the index types described herein are by way of illustration, and not limitation. The present invention is capable of using any index type suitable for organizing a set of filters.

Figure 5:
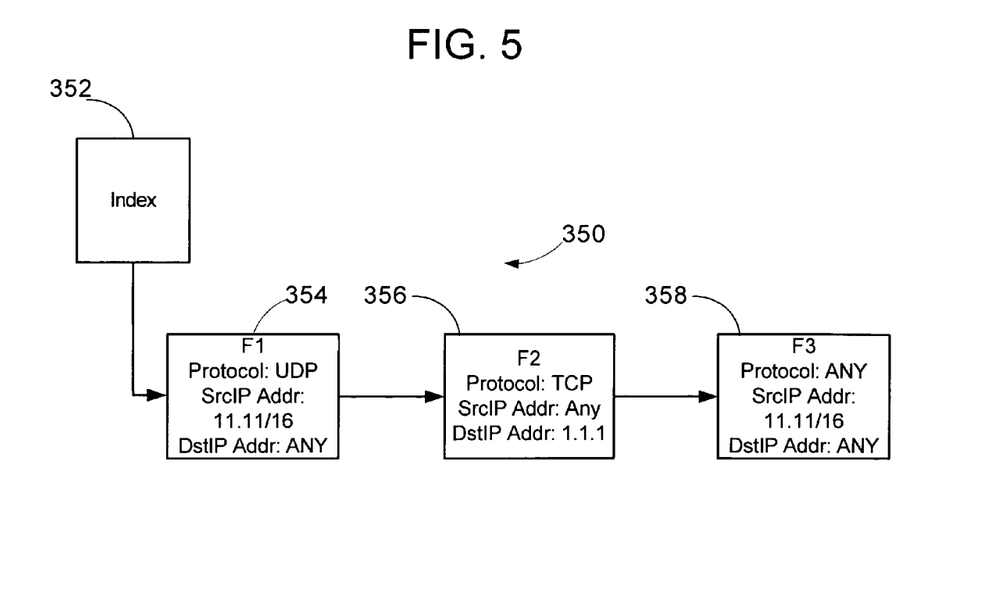
FIG. 5 is a block diagram illustrating a method of indexing filters using a linked list according to the present invention.

FIG. 5 illustrates an index 350 organized as a linked list. The linked list index includes an index entry 352 and a set of filters. In the example shown, the set of filters includes a first filter 354, a second filter 356, and a third filter 358.

The filters are shown in simplified form with representative filter conditions 318. The filter conditions 318 are depicted as field type 320:field data 322. For example, the first filter 354 includes three filter conditions. A first filter condition is "Protocol: UDP," which represents a protocol field type 320 with corresponding field data 322 of UDP. A second filter condition is "Src IP Addr: 11.11/16," which represents a source IP address field type 320 with corresponding field data 322 of 11.11/16, which as previously described designates addresses in the range of 11.11.0.0. to 11.11.255.255. A third filter condition is "Dst IP Addr: Any," which represents a destination IP address field type 320 with corresponding field data 322 of "Any," which as previously described represents a wild card signifying that any destination IP addresses matches the filter condition.

The index entry 352 identifies the first filter 354 using any suitable method such as, for example, a pointer. The first filter 354 identifies the second filter 356 and the third filter 358 includes data identifying it as the last filter. It will be understood that only a limited number of filters are shown in the example. The linked list may include any number of filters.

The firewall 208 uses the linked list index 350 by first referencing index entry 352 to identify the first filter 354. The firewall 208 then compares the packet information to the filter conditions in the first filter 354 to determine if the filter conditions 318 match the packet. The firewall 208 then identifies the second filter 356 from the pointer or other data in the first filter 354. The firewall then compares the packet information to the filter conditions 318 in the second filter 356 to determine if the filter conditions match the packet.

The firewall 208 continues to traverse the linked list 350 until all matching filters are identified. Alternatively, the firewall discontinues traversing the linked list 350 when a matching filter with the highest filter weight 314 is identified. To facilitate identifying the filter with the highest weight 314, the preprocessor 210 may organize the filters in the linked list in descending order from highest filter weight to lowest filter weight. Accordingly, the first matching filter identified by the firewall is also the highest weight filter.

Figure 6:
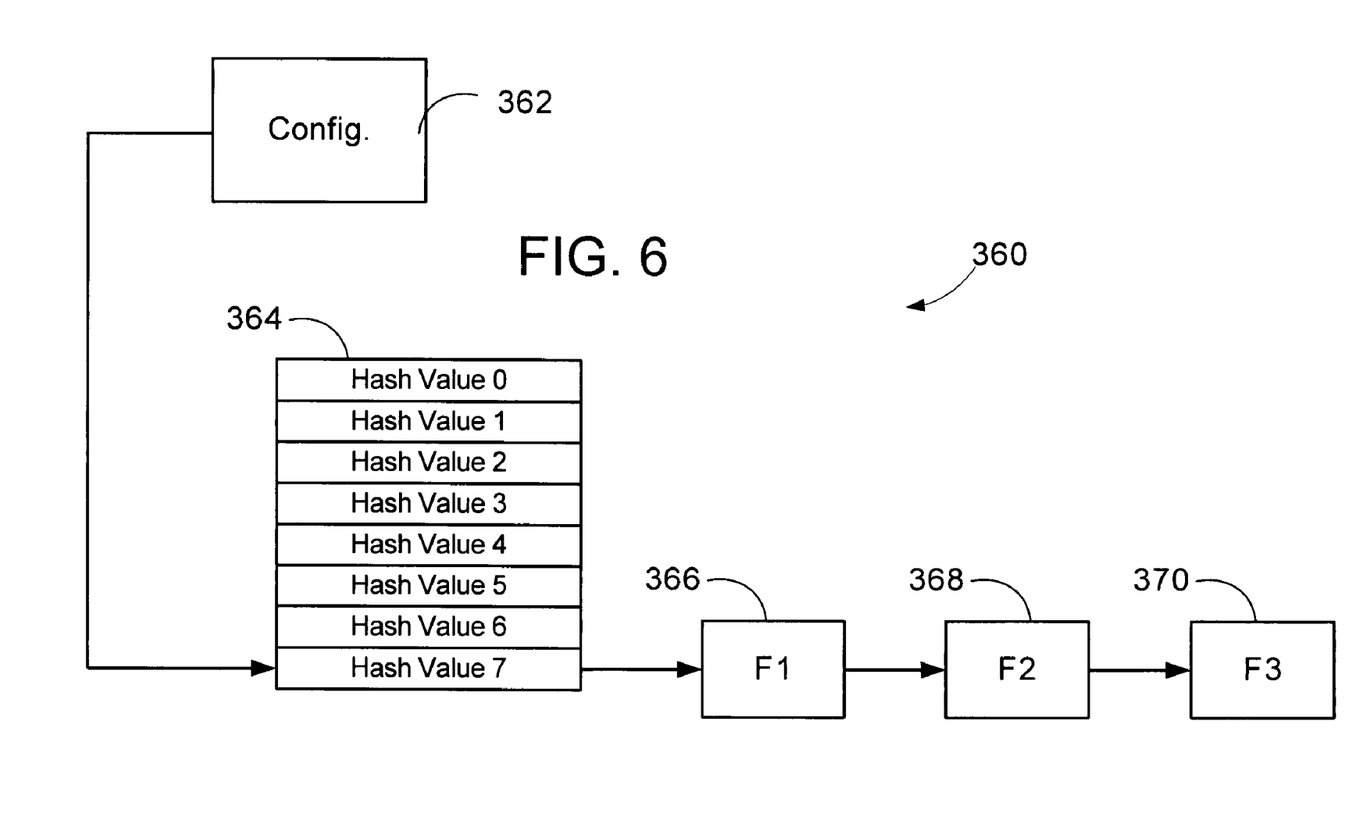
FIG. 6 is a block diagram illustrating a method of indexing filters using a hash table according to the present invention.

FIG. 6 illustrates an index 360 organized as a hash table. The hash table index includes a configuration module 362, one or more hash table entries 364, and a plurality of filters. Each filter of the plurality of filters comprises a data structure as previously described herein.

Each entry in the one or more entries 364 includes a hash value. The hash value is calculated by executing a hash function on the field data 322 in one or more filter conditions 318 stored in the filters identified by the hash index. The hash function transforms the field data 322 into a fixed length value that is usually shorter in length than the actual field data 322.

Each entry in the one or more entries 364 further forms part of linked list identifying one or more filters. For example "Hash Value 7" in FIG. 6 forms part of linked list including a first filter 366, a second filter 368, and a third filter 370. The linked list of filters corresponding to a hash value in entries 364 include filters with filter conditions 318 that hash to the specified hash value. For example, the first filter 366, the second filter 370, and the third filter 370 have filters conditions that hash to "Hash Value 7."

The configuration module 362 creates and maintains the hash entries 364. When the hash table index is created, the configuration module 362 selects the filter conditions 318 subject to the hash function. The configuration module 362 may also identify a mask for the field data 322 stored in each filter condition. For example, if the field data 322 includes a source IP address, the configuration module 362 selects a mask of "/16" meaning that only the first 16 bits of the source IP address are subject to the hash function. The configuration module then calculates the hash value for the filters, creates a hash entry for each unique hash function value, and creates the linked list of filters for each hash table entry.

When a new filter is added to the hash index 360, the configuration module 362 executes the hash function on the selected filter conditions generating a resultant value. If the resultant value is already included as an entry 364, the configuration module updates the linked list of filters corresponding to the entry 364 to include the new filter. If the resultant value is not already included as an entry 364, the configuration module adds a new entry with the resultant value and creates a linked list for the new entry that includes the new filter.

When the firewall 208 examines a filter, it traverses the hash index to identify any matching filters. The firewall 208 uses the configuration module 362 to calculate a hash value for the packet. The configuration module 362 executes the hash function on the same information from the packet that was used to create the hash value entries 364. For example, if the entries were created by hashing source IP addresses from the filters, the configuration module executes the hash function on the source IP address information from the packet. The configuration module 362 subjects the packet information to a mask if necessary before calculating the hash value. The firewall 208 then determines whether the hash value calculated from the packet matches any of the entries 364. If any of the entries match the hashed packet information, the firewall traverses the corresponding linked list. As described with reference to FIG. 5, the linked list of filters corresponding to each hash entry 364 may be arranged in descending order of filter weight to facilitate finding the matching filter with the highest filter weight 314.

Figure 7:
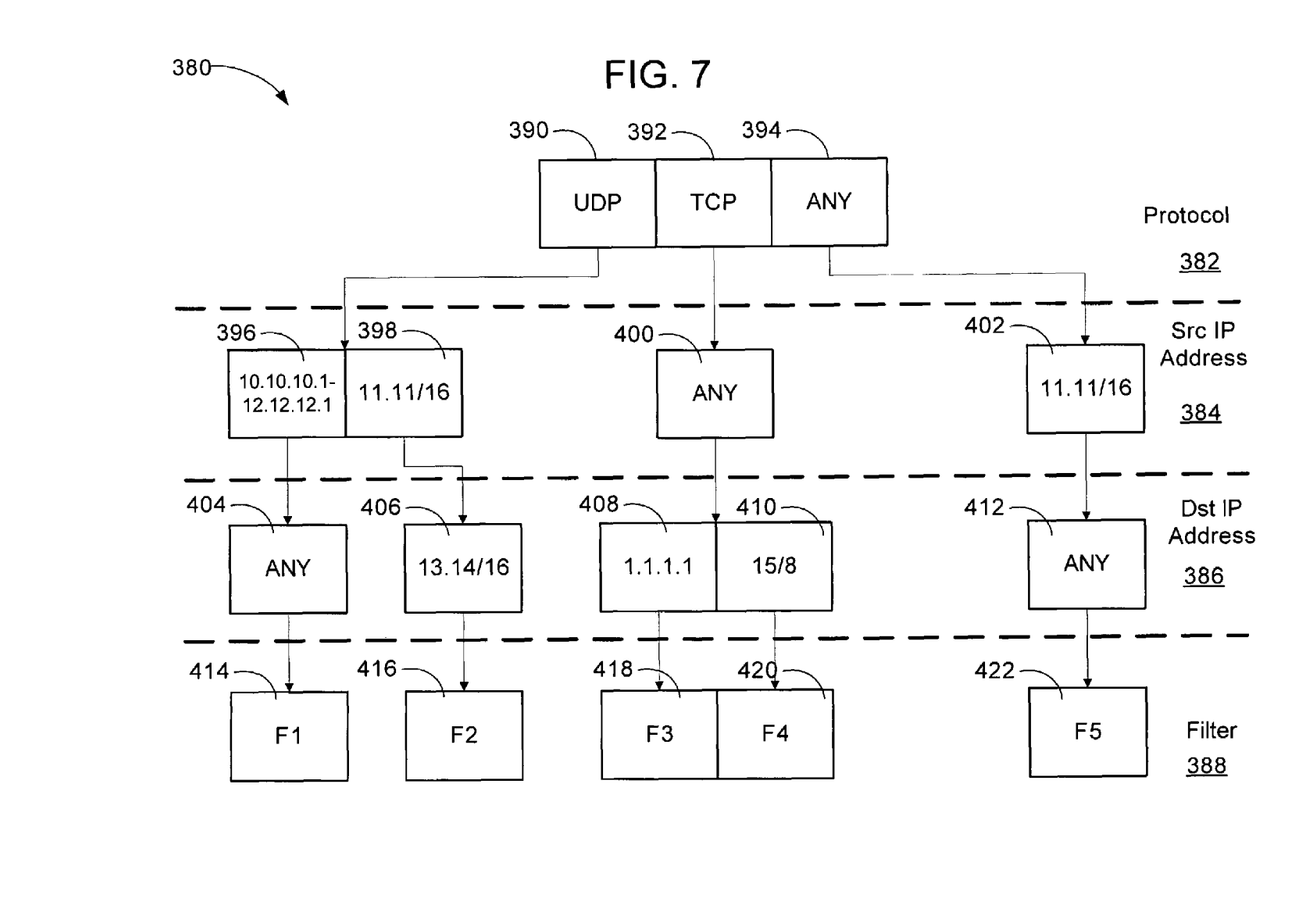
FIG. 7 is block diagram illustrating a method of indexing filters using a tree structure according to the present invention.

FIG. 7 illustrates an index 380 organized as a tree data structure. The index includes a plurality of layers including a protocol layer 382, a source IP address layer 384, a destination IP address layer 386, and a filter layer 388. The filter layer 388 includes the filters identified by the index 380. The plurality of layers illustrated in FIG. 7 is provided by way of example, as any suitable layers may be used.

Layers 382, 384, 386 correspond to one of the field types 320 designated in the filters identified by the index 380. For example, the protocol layer 382 corresponds to a "protocol" field type wherein protocol types are specified. The source IP address layer 384 corresponds to a "source IP address" field type 320 wherein source IP addresses are specified. The "destination IP address" layer 386 corresponds to a destination IP address field type 320 wherein destination IP addresses are specified.

Each layer includes a set of nodes and stored in each node is field data 322 from the filters in the index corresponding to the field type 320 defining the layer. For example, the protocol layer 382 includes a first node 390 with data of "UDP," a second node 392 with data of "TCP," and a third node 394 with data of "Any." Thus, in the example, the filters organized in the index 380 each have a protocol field type 320 as a filter condition 318 and have corresponding field data 322 being one of "UDP," "TCP," or the wild card "Any."

The nodes in each layer, except for the filter layer 386, identify one or more nodes in a subsequent layer thereby forming a branch of nodes ultimately terminating with one of the filters. The example shown in FIG. 7 includes five branches. A first branch includes nodes 390, 396, 404, and terminates with node 414 representing a first filter F1. A second branch includes nodes 390, 398, 406, and terminates with node 416 representing a second filter F2. A third branch includes nodes 392, 400, 408, and terminates with node 418 representing a third filter F3. A fourth branch includes nodes 392, 400, 410, and terminates with node 420 representing a fourth filter F4. A fifth branch includes nodes 394, 402, 412, and terminates with node 422 representing a fifth filter F5.

The data in the nodes along a branch correspond to the field data 322 included in the filter conditions 318 for the filter that terminates the branch. For example, the first filter 414 includes at least three filter conditions: a first filter condition 318 having a field type 320 of protocol with corresponding field data 322 of "UDP," a second filter condition 318 having a field type of source IP address with corresponding field data 322 specifying a range of IP addresses 10.10.10.1-12.12.12.1, and a third filter condition having a field type 320 of destination IP address with corresponding field data 322 of "Any" corresponding to a wild card value.

The firewall 208 uses the index 380 by examining the nodes at each layer and comparing the data in the nodes to the information in the packet under examination. If the firewall 208 identifies a node with data that matches information in the packet, the firewall 208 traverses the branch to which that node belongs to the subsequent layer. The firewall 208 then compares the packet information to the data in the nodes along the same branch in the subsequent layer. The process continues until the bottom filter layer 388 is reached or until no nodes along the branch at a layer include data matching the information in the packet. If the firewall 208 reaches the bottom filter layer 388, it compares the information in the packet to any remaining filter conditions. The remaining filter conditions are filter conditions having field types 320 not designated as one of the layers in the tree data structure.

The tree data structure used to organize the index 380 is a single lookup tree or, alternatively, a multi-lookup tree. In a single lookup tree, the data in the nodes for a given layer do not overlap. As a result, only one filter in the index, at most, matches a packet. Thus, once the firewall 308 identifies a matching filter, the firewall discontinues traversing the index 380 as it is guaranteed that no additional matching filters exist.

The multiple-lookup tree can include nodes in a layer with overlapping filters conditions. Thus, the packet under examination may match more than one filer in the index. FIG. 7 illustrates a multi-lookup tree because the protocol field type layer 382 includes "UDP," "TCP," and "Any." A packet under examination using a UDP or TCP transport layer protocol matches at least two nodes, i.e. "any" and either "TCP" or "UDP." Thus, the firewall 310 may need to traverse more than one branch.

When the preprocessor creates the tree index 380, it determines whether to create the index as a single lookup tree or a multi-lookup tree. The preprocessor 210 also identifies which field types 322 to include as the layers in the tree and a field order, i.e. which field type 322 forms the first layer, which field type 322 forms the second layer, and so forth.

The nodes in the index 380 may include additional data to optimize filter lookup. For examples, the node specifies the highest filter weight 314 for the filters in the same branch as the node. Identifying the highest weight 314 of the filters in the branch permits the firewall 208 skip the branch if a higher weight matching filter has already been identified.

Figure 8:
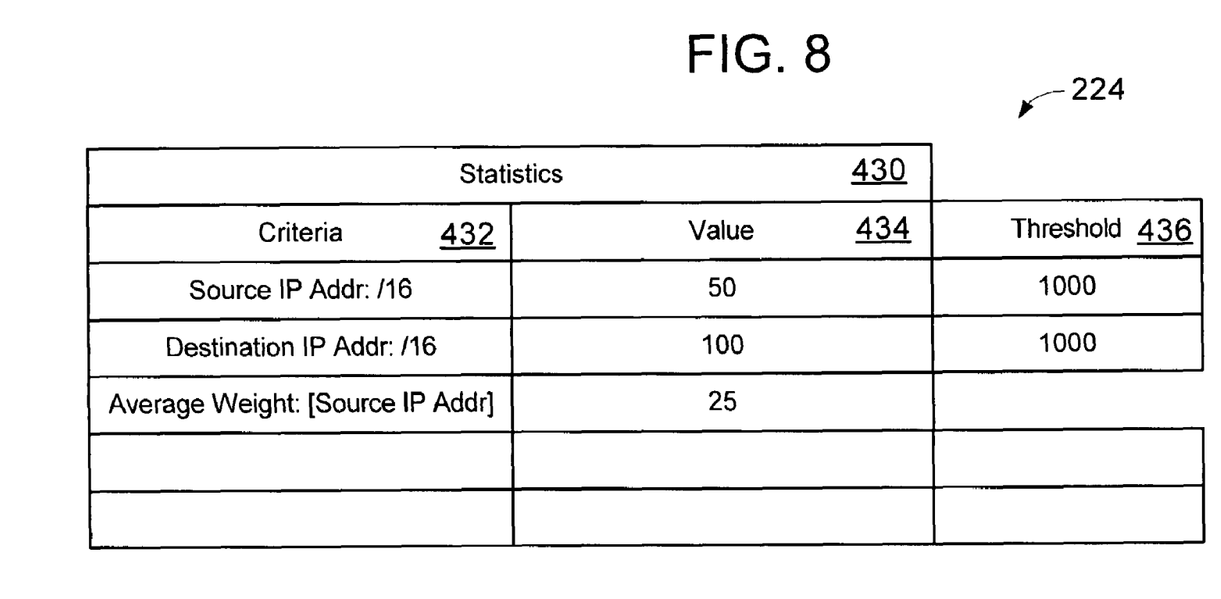
FIG. 8 is a block diagram of a data structure used to maintain filter statistics according to the present invention.

FIG. 8 illustrates an example of the data structure 224 used by the preprocessor 210 to maintain statistics and track threshold values. The statistics 430 each include a criteria 432, and corresponding value 434. Any criteria may be established. Examples include: total filters in the index; filters using a particular subnet mask, e.g. "/8," "/16," "/24;" average field weight for one or more filter conditions, e.g. source IP address, destination IP address, and the like. The criteria 432 may also include correlation between two or more fields, for example filters with source and destination IP addresses using certain subnet masks.

The corresponding value 434 includes a value representing the number of filters that meet the corresponding criteria 432. For example, FIG. 8 shows the criteria 432 "Source IP Addr:/16," which in the example means filters that specify a source IP address as a field type 320 and that include field data 322 with a 16-bit subnet mask. The corresponding value 434 of 50 indicates that 50 filters meet that criteria. The criteria "average weight:[source IP Addr]" represents a statistic maintained whereby the average field weight 324 of the source IP address field type 320 is tracked for the installed filters. As shown in the example, the average field weight is 25.

The data structure 224 may include a threshold value 436 for each criteria 432. The preprocessor 210 compares the value 434 to the corresponding threshold value 436. If the threshold value is exceeded, the preprocessor takes programmed action, such as creating a new index.

The statistics are also used by the preprocessor to determine the index type to be used when creating a filter, identifying which field types to use in the index, i.e. index fields, and for creating an index order. Selection of the index type, index order, and index fields is described in more detail with reference to FIG. 11.

It will be understood that the criteria 432, values 434, and thresholds 436 shown in FIG. 8 are by way of example. Any suitable criteria 432 and thresholds 436 are maintained, and the value 434 in the data structure 234 is dynamically calculated based upon the actual filters installed in the firewall 208.

Figure 9:
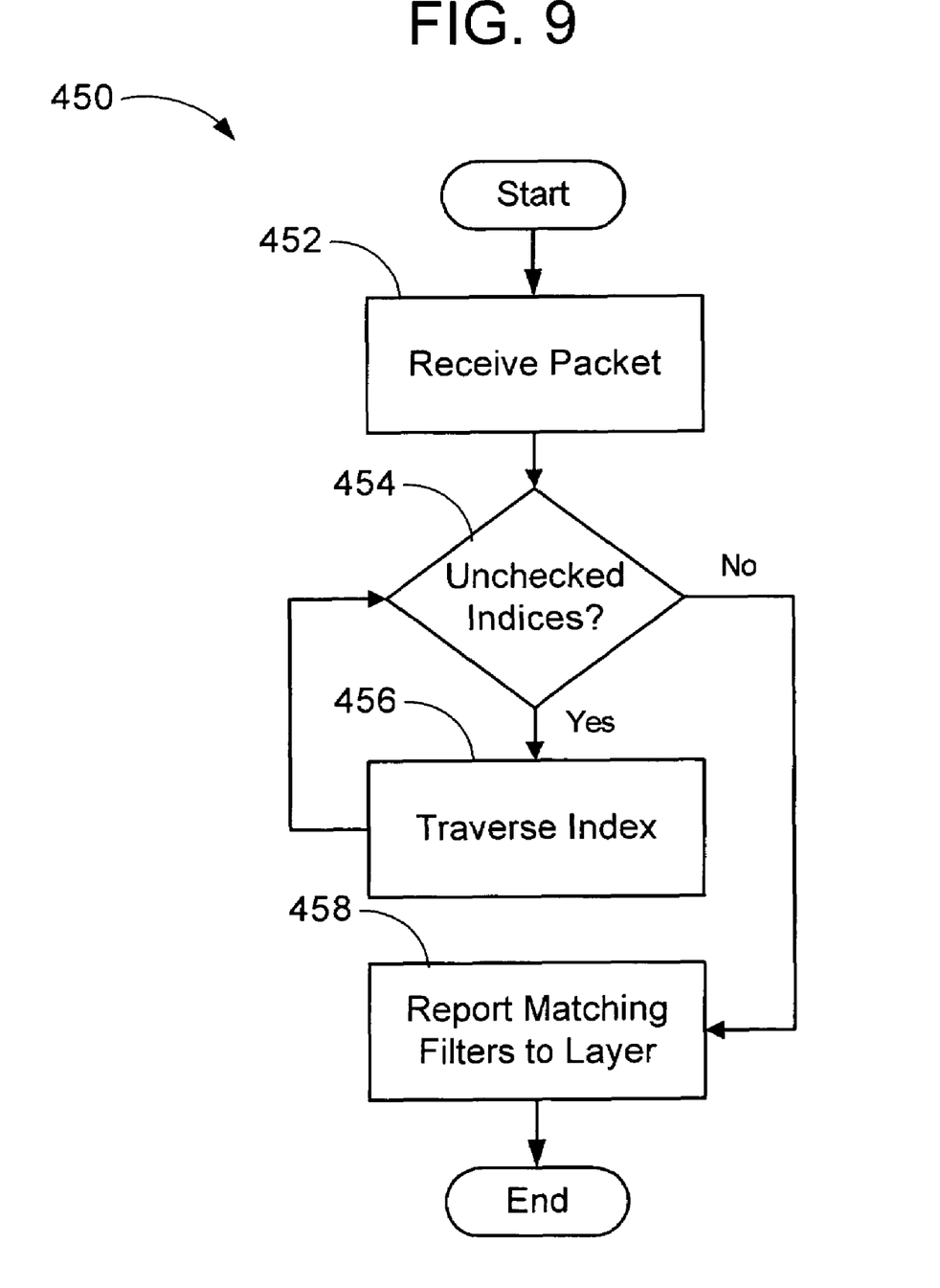
FIG. 9 is a flow diagram illustrating a method used to identify matching filters.

FIG. 9 illustrates a method 450 used by the firewall 208 to identify matching filters. When the firewall 208 maintains indices at each layer in the network stack 252 as described with reference to FIG. 3, the method described herein is repeated at each layer.

In step 452, the firewall 208 receives the packet from a system process, such as one of the layers in the network stack 252. The network stack 252 may parse information from the packet, such as IP addresses, ports, protocol and the like. Parsing information from the packet allows the firewall 208 to compare the packet information to the filter conditions without having to perform a separate and redundant parsing function.

In step 454, the firewall 208 determines whether there are any indices assigned to the layer and if so, whether any indices have not been checked for matching filters. Initially, all indices maintained in the layer are unchecked, and the firewall traverses one of the plurality of indices as shown in step 456. The firewall 208 identifies matching filters from the index. As described with reference to the preceding figures, the firewall 208 may identify only the matching filter with the highest filter weight 314.

The firewall 208 then determines whether any additional unchecked indices exist as shown in step 454. If so, the firewall checks the next index for additional matching filters. The firewall tracks the highest weight matching filter throughout the method 450 thereby permitting the firewall 208 to stop searching an index if it determines that no potentially higher weight matching filters exist. The process repeats as generally shown. The general purpose index is usually checked last.

Once all indices are checked, the firewall 208 reports any matching filters to the layer in the network stack. The firewall 208 can report only the highest weight matching filter or, alternatively, reports additional matching filters. The layer then determines whether to take any actions specified in the matching filters on the packet according to the network policy.

Figure 10:
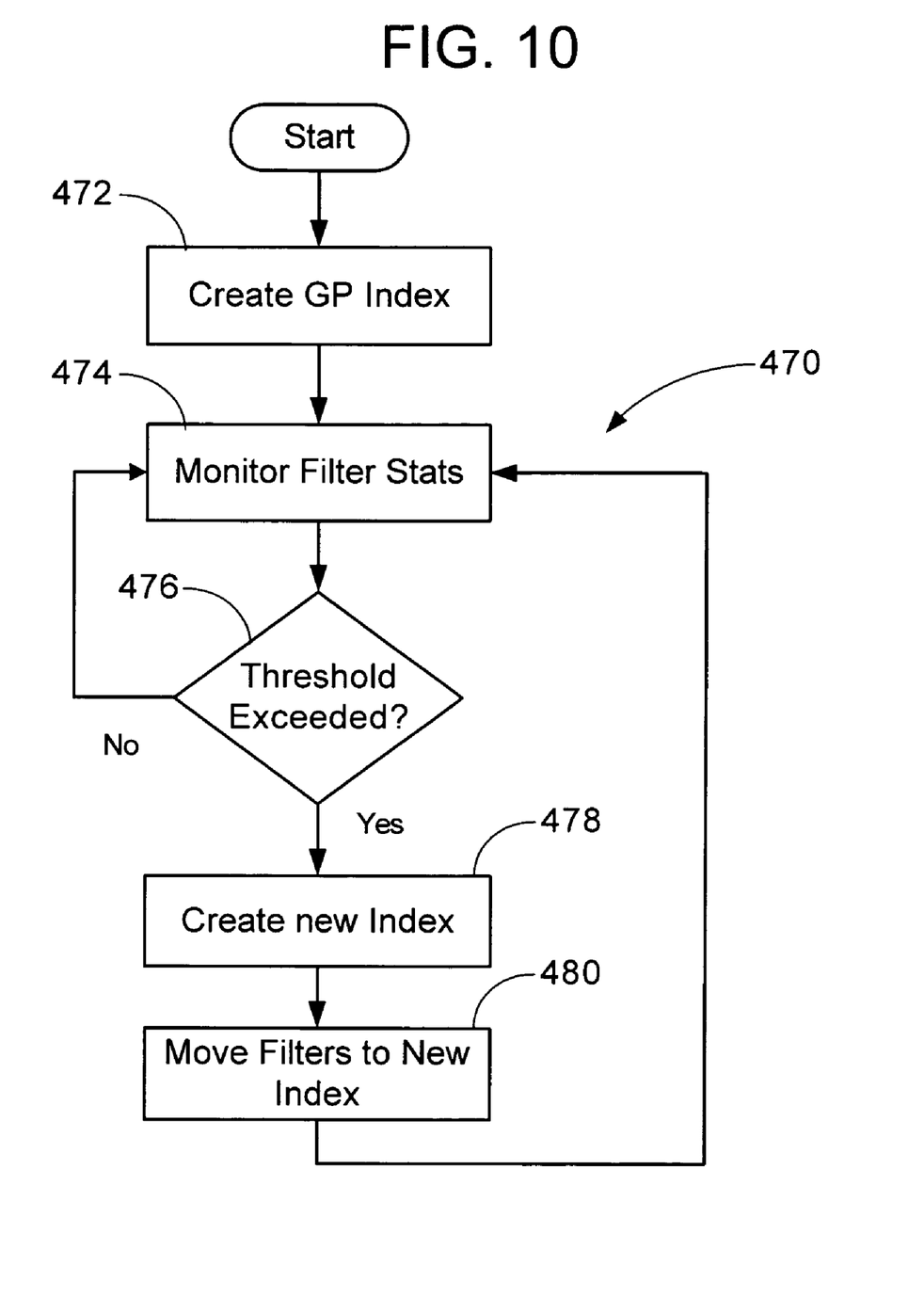
FIG. 10 is a flow diagram illustrating a method used to monitor filter statistics and to create new indices according to the present invention.

FIG. 10 illustrates a method 470 used by the preprocessor 210 to manage the various indices. As previously described, the preprocessor 210 is capable of maintaining a separate set of indices at each individual layer in the network stack 252.

As shown in step 472, the preprocessor 210 creates a first index, referred to as the general purpose index. The general purpose index is created when the first firewall filter is added to the layer. Initially, new filters are added to the general purpose index. The general purpose index is any suitable type. Preferably, the general purpose index is a linked list or a multi-lookup tree because these index types are capable of accommodating any filter regardless of the field types 320 and corresponding field data 322 defined therein.

The preprocessor 210 maintains statistics on the filters in the general purpose index as additional filters are added as shown in step 474. The statistics are maintained in a data structure, such as the data structure 224 described with reference to FIG. 8. The preprocessor 210 may be designed to only maintain statistics if the total number of filters exceeds a minimum value. For example, the preprocessor 210 does not maintain statistics if the total number of installed filers is less than 50. Disabling the function of maintaining statistics in this manner decreases the overhead of the firewall 208 when only a relatively small number of filters are included in the firewall.

In step 476, the preprocessor 210 determines whether any of the values 434 for the selected criteria 432 exceed a corresponding threshold value 436. If the threshold value is not exceeded, the preprocessor continues to monitor the statistics as shown in step 474.

If the threshold value is exceeded, the preprocessor 210 creates a second index as shown in step 478. The preprocessor 210 needs to select an index type and an index order for the second index. The process used to select the index type and index order is described with reference to FIG. 11.

In step 480, the preprocessor 210 moves a subset of filters from the first index to the second index. The filters moved into the second index are filters with filter conditions 318 that meet the criteria exceeding the threshold. For example, if the criteria exceeding the threshold value is filters having source IP addresses with the subnet mask "/16," the preprocessor 210 moves any filters that have a source IP address field type 320 and corresponding field data 322 having a "/16" mask to the second index.

The preprocessor continues to maintain statistics as shown in step 474 for both the first index and second index and creates a third index when another threshold value is exceeded. The process continues and additional indices are created as required according to the selected criteria 432 and corresponding values 434 and thresholds 436.

Figure 11:
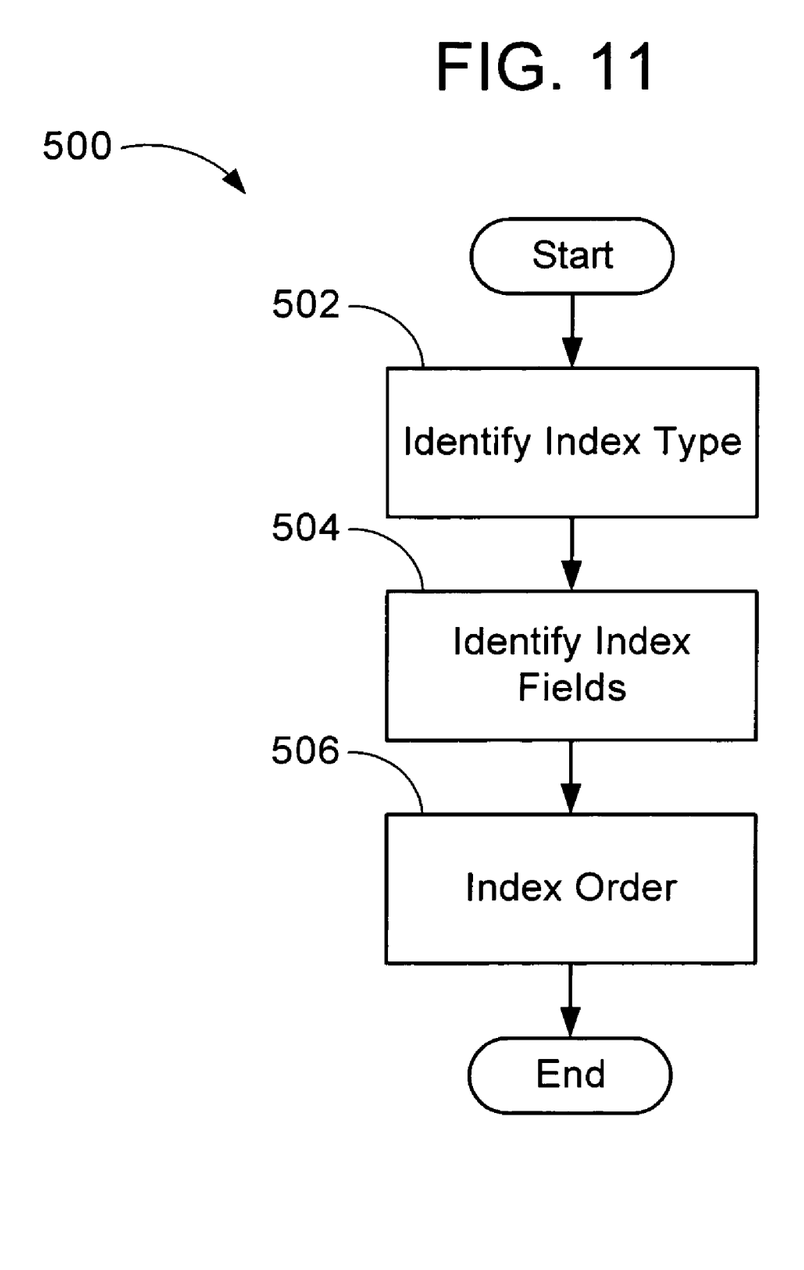
FIG. 11 is a flow diagram illustrating a method used to create new indices according to the present invention.

FIG. 11 illustrates a method 500 used by the preprocessor 210 to create a new index. In step 502, the preprocessor selects an index type. Typical index types include linked list, hash table, and tree structure as described with reference to FIG. 5-FIG. 7. The type of index selected depends upon the number of filters to be indexed as well as the field types 320 and corresponding field data 322 included in the filters to be indexed.

The linked list index type as described in FIG. 5 is suitable for identifying a relatively small number of filters. Usually only a single index in a layer will be a linked list. The linked list is not suitable for use with a relatively large number of filters because the firewall 208 potentially needs to examine every filter in the linked list when examining a packet.

The hash table index type as described in FIG. 6 is suitable for identifying a large number of filters provided the field data 322 specified in the filter conditions 318 is suitable for hashing. Single IP addresses, ports, and protocol types as well as IP address ranges specified by a subnet mask are suitable for hashing because information in a packet will hash to the same value if the packet information matches the corresponding filter conditions. The hash table index type is usually not suitable for indexing field data 322 that includes arbitrary ranges or strings.

The tree data structure as described in FIG. 7 is suitable for identifying large numbers of filters and, unlike the hash table index type, accommodates generic ranges of data such as IP addresses that cannot be specified with a subnet mask. As previously described, the single lookup tree has advantages because the firewall 208 only identifies at most one matching filter per index. Thus, once the firewall 208 finds a matching filter for a packet, it discontinues index traversal.

The multiple lookup index also accommodates generic ranges. Furthermore, the multiple lookup tree handles overlapping field data 322 at a given layer in the index. Thus, the preprocessor 208 can always add a new filter into the multiple lookup tree index. However, because the multiple lookup tree can identify more than one filter matching a packet, the firewall 208 may need to traverse more than one branch in the tree.

If the index type is hash table or tree structure, the preprocessor 208 selects one or more index fields as shown in step 504. Index fields are field types 320 in the filters included in the index. If the index type is a hash table, the preprocessor 208, and more specifically configuration module 362 needs to determine which field types 320 are subject to the hash function. For the tree index, the preprocessor 208 selects the field types 320 that will comprise the layers in the tree index. The field types 320 selected to use in the index are field types with high average field weights 324, as determined from the maintained statistics 224.

As shown in the step 506, the preprocessor 208 creates an index order. The linked list type index has the index order set such that the list places the filters in descending order of filter weight. The hash table index type is likewise ordered so that the linked list identified by each hash value is in filter weight order.

In the tree structure, the layers are ordered from the top layer to the bottom layer. The field type 320 with the highest average field weight 324 is placed in the top layer, the field type 320 with the second highest average field weight 324 is placed in the second layer, and so forth with the actual filters forming the bottom layer.

All of the references cited herein are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method for dynamically creating and maintaining a set of indices in a computer, wherein the indices identify a plurality of filters defining a network policy and wherein the indices are used by a firewall to identify a matching filter, comprising:

creating a first index conforming to a first index type;

identifying, in the first index, a first set of filters, each filter in the first set of filters specifying network packets subject to the network policy;

maintaining statistics including a selected criteria and a corresponding value, wherein the value identifies a number of filters from the first set of filters meeting the selected criteria;

determining that the corresponding value exceeds a threshold value;

creating a second index conforming to a second index type;

identifying, in the second index, a second set of filters, wherein the second set of filters are a subset of the first set of filters; and removing identification of the subset of filters from the first index.

2. The method of claim 1, wherein the second index type is a linked list.

3. The method of claim 1, wherein the second index type is a tree data structure.

4. The method of claim 3, wherein the tree data structure is a single lookup tree.

5. The method of claim 3, wherein the tree data structure is a multiple lookup tree.

6. The method of claim 1, wherein the second index is a hash table.

7. The method of claim 1, wherein the plurality of filters include a set of filter conditions including a plurality of field types and corresponding field data, further comprising: selecting one or more field types from the plurality of field types to be indexed.

8. The method of claim 1, wherein the second index is a linked list, and each filter includes a weight value, further comprising: ordering the filters in the linked list such that a filter with a highest weight value is first in the linked list and a filter with the lowest weight value is last in the linked list.

9. The method of claim 1 further comprising: adding a new filter to the firewall; selecting an index from the first and second index, and adding the new filter to the selected index.

10. The method of claim 1, wherein the second set of filters include filter conditions that meet the selected criteria.

11. A method for creating a filter index used to identify a plurality of filters used with a network firewall, each filter of the plurality of filters including a set of filter conditions and a filter weight, each filter condition including an individual field weight, comprising:

identifying an index type based upon the filter conditions of the plurality of filters;

identifying a subset of filter conditions to include in the index based upon an average field weight calculated from the individual field weight; and selecting an order by which the subset of filter conditions are placed in the index.

12. The method of claim 11, wherein the index is a tree structure.

13. The method of claim 12, wherein the tree structure is a multi-lookup tree.

14. The method of claim 12, wherein the tree structure is a single lookup tree.

15. The method of claim 11, wherein the index is a hash table index.

16. A computer storage medium having computer executable instructions for dynamically creating and maintaining a set of indices in a computer, wherein the indices identify a plurality of filters defining a network policy and wherein the indices are used by a firewall to identify a matching filter, comprising:

creating a first index conforming to a first index type;

identifying, in the first index, a first set of filters, each filter in the first set of filters specifying network packets subject to the network policy;

maintaining statistics including a selected criteria and a corresponding value, wherein the value identifies a number of filters from the first set of filters meeting the selected criteria;

determining that the corresponding value exceeds a threshold value;

creating a second index conforming to a second index type;

identifying, in the second index, a second set of filters, wherein the second set of filters are a subset of the first set of filters; and removing identification of the subset of filters from the first index.

17. The computer storage medium of claim 16, wherein the plurality of filters include a set of filter conditions including a plurality of field types and corresponding field data, further comprising: selecting one or more field types from the plurality of field types to be indexed.

18. The computer storage medium of claim 16, wherein the index is a linked list, and each filter includes a weight value, further comprising: ordering the filters in the linked list such that a filter with a highest weight value is first in the linked list and a filter with the lowest weight value is last in the linked list.

19. The computer storage medium of claim 16, further comprising: adding a new filter to the firewall; selecting an index from the first and second index, and adding the new filter to the selected index.

20. The computer storage medium of claim 16 wherein the second set of filters include filter conditions that meet the selected criteria.

21. A computer storage medium having computer executable instructions for creating a filter index used to identify a plurality of filters used with a network firewall, each filter of the plurality of filters including a set of filter conditions and a filter weight, each filter condition including an individual field weight, comprising:

identifying an index type based upon the filter conditions of the plurality of filters;

identifying a subset of filter conditions to include in the index based upon an average field weight calculated from the individual field weight; and selecting an order by which the subset of filter conditions are placed in the index.

22. The computer storage medium of claim 21, wherein the second index type is a linked list.

23. The computer storage medium of claim 21, wherein the second index type is a tree data structure.

24. The computer storage medium of claim 23, wherein the tree data structure is a single lookup tree.

25. The computer storage medium of claim 23, wherein the tree data structure is a multiple lookup tree.

26. The computer storage medium of claim 23, wherein the second index is a hash table.

* * * * *